United States Patent
Chen et al.

(10) Patent No.: US 10,897,792 B2
(45) Date of Patent: Jan. 19, 2021

(54) METHOD AND APPARATUS OF NEW RADIO V2X CLUSTER HEAD

(71) Applicant: MediaTek Inc., Hsinchu (TW)

(72) Inventors: Ju-Ya Chen, Hsinchu (TW); Chien-Yi Wang, Hsinchu (TW); Ahmet Umut Ugurlu, Cambridge (GB)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 16/584,943

(22) Filed: Sep. 27, 2019

(65) Prior Publication Data

US 2020/0107395 A1    Apr. 2, 2020

Related U.S. Application Data

(60) Provisional application No. 62/738,026, filed on Sep. 28, 2018.

(51) Int. Cl.
| | |
|---|---|
| H04W 84/20 | (2009.01) |
| H04W 4/40 | (2018.01) |
| H04W 72/04 | (2009.01) |
| H04W 24/10 | (2009.01) |
| H04W 88/02 | (2009.01) |

(52) U.S. Cl.
CPC ............ *H04W 84/20* (2013.01); *H04W 4/40* (2018.02); *H04W 24/10* (2013.01); *H04W 72/0406* (2013.01); *H04W 88/02* (2013.01)

(58) Field of Classification Search
CPC ....... H04W 84/20; H04W 4/40; H04W 24/10; H04W 72/0406; H04W 88/02
USPC ......................................... 455/519, 518, 297
See application file for complete search history.

(56) References Cited

U.S. PATENT DOCUMENTS

| | | | |
|---|---|---|---|
| 7,904,070 B2 * | 3/2011 | Lee ....................... | H04W 24/08 455/418 |
| 8,023,981 B2 * | 9/2011 | Rosen ................... | H04L 47/824 455/518 |
| 8,027,696 B2 * | 9/2011 | Wiatrowski ........ | H04W 72/005 455/518 |

(Continued)

FOREIGN PATENT DOCUMENTS

CN         106612549 A       5/2017

OTHER PUBLICATIONS

China National Intellectual Property Administration, International Search Report and Written Opinion for PCT/CN2019/108495, dated Jan. 3, 2020.

(Continued)

*Primary Examiner* — Hai V Nguyen
(74) *Attorney, Agent, or Firm* — Han IP PLLC; Andy M. Han (57) ABSTRACT

Various examples and schemes pertaining to methods and apparatus of a New Radio (NR) vehicle-to-everything (V2X) cluster head are described. An apparatus implemented as a source user equipment (UE) determines whether there is a need to either join a cluster or become a cluster head in an NR V2X communication environment. The apparatus also detects whether there is any existing cluster head in the NR V2X communication environment responsive to determining that there is the need. The apparatus then determines whether to join a first cluster associated with a first cluster head responsive to the first cluster head being detected as an existing cluster head in the NR V2X communication environment.

20 Claims, 3 Drawing Sheets

(56) References Cited

U.S. PATENT DOCUMENTS

| | | | | |
|---|---|---|---|---|
| 8,265,679 | B2* | 9/2012 | Ananthanarayanan | H04W 28/24 455/518 |
| 8,831,662 | B2* | 9/2014 | Qi | H04W 4/00 455/518 |
| 2005/0272454 | A1* | 12/2005 | Hiller | H04L 65/4061 455/518 |
| 2007/0232353 | A1* | 10/2007 | Miyazaki | H04W 88/085 455/557 |
| 2009/0280849 | A1* | 11/2009 | Rosen | H04L 47/822 455/518 |
| 2010/0004012 | A1* | 1/2010 | Ananthanarayanan | H04W 28/24 455/518 |
| 2015/0230160 | A1 | 8/2015 | Lin et al. | |
| 2016/0205519 | A1* | 7/2016 | Patel | H04L 41/5041 455/518 |
| 2019/0020987 | A1* | 1/2019 | Khoryaev | H04W 72/046 |
| 2019/0075548 | A1* | 3/2019 | Lee | H04W 88/06 |
| 2019/0079659 | A1* | 3/2019 | Adenwala | H04W 4/026 |
| 2019/0110178 | A1* | 4/2019 | Baghel | H04W 4/40 |
| 2019/0239112 | A1* | 8/2019 | Rao | H04W 72/0406 |
| 2019/0239118 | A1* | 8/2019 | Baghel | H04W 4/40 |
| 2019/0273637 | A1* | 9/2019 | Zhang | H04B 5/0031 |
| 2019/0306923 | A1* | 10/2019 | Xiong | H04W 72/042 |
| 2019/0335534 | A1* | 10/2019 | Atarius | H04W 80/10 |
| 2019/0363843 | A1* | 11/2019 | Gordaychik | H04W 72/042 |
| 2020/0029340 | A1* | 1/2020 | He | H04W 4/40 |
| 2020/0037343 | A1* | 1/2020 | He | H04W 72/1263 |
| 2020/0053835 | A1* | 2/2020 | Ye | H04L 1/08 |
| 2020/0067610 | A1* | 2/2020 | Lee | H04B 17/318 |
| 2020/0092685 | A1* | 3/2020 | Fehrenbach | H04B 7/2606 |
| 2020/0100070 | A1* | 3/2020 | Cheng | H04W 24/08 |
| 2020/0107354 | A1* | 4/2020 | Chen | H04W 72/02 |

OTHER PUBLICATIONS

LG Electronics, Discussion on Resource Allocation in D2D Communications, 3GPP TSG RAN WG1 Meeting #75, R1-135481, San Francisco, USA, Nov. 11-15, 2013.

Mediatek Inc., On Sidelink Resource Allocation Mechanism, 3GPP TSG RAN WG1 Meeting #95, R1-1812367, Spokane, USA, Nov. 12-16, 2018.

Alcatel-Lucent et al., Access scheme for D2D broadcast communications, 3GPP TSG-RAN WG RAN3#83 bis, R2-133486, Ljubljana, Slovenia, Oct. 7-11, 2013.

* cited by examiner

METHOD AND APPARATUS OF NEW RADIO V2X CLUSTER HEAD

CROSS REFERENCE TO RELATED PATENT APPLICATION(S)

The present disclosure is part of a non-provisional application claiming the priority benefit of U.S. Patent Application No. 62/738,026, filed on 28 Sep. 2018, the content of which being incorporated by reference in its entirety.

TECHNICAL FIELD

The present disclosure is generally related to wireless communications and, more particularly, to techniques pertaining to a New Radio (NR) vehicle-to-everything (V2X) cluster head.

BACKGROUND

Unless otherwise indicated herein, approaches described in this section are not prior art to the claims listed below and are not admitted as prior art by inclusion in this section.

Under the 3$^{rd}$ Generation Partnership Project (3GPP) specifications, vehicle platooning can support reliable vehicle-to-vehicle (V2V) communications between a specific user equipment (UE) supporting V2X applications and up to nineteen other UEs supporting V2X applications. Moreover, under the 3GPP specifications, in NR Sidelink, multiple UEs may be grouped into a cluster with a cluster head scheduling the time-frequency resources for other UEs in the cluster. Scheduling by cluster head is a centralized scheduling scheme, and centralized scheduling tends to be more reliable and more suitable in situations with crowded traffic than distributed scheduling. For centralized scheduling, the cluster head can sense its local environment and, accordingly, schedule available resources faster than a base station (e.g., gNB) can. Currently, whether and how a UE becomes a cluster head, as well as whether and how a UE decides to join an existing cluster as opposed to becoming a cluster head itself, remains to be defined.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to methods and apparatus of an NR V2X cluster head. Specifically, an objective of the present disclosure is to propose schemes related to whether and how a UE becomes a cluster head, as well as whether and how a UE decides to join an existing cluster as opposed to becoming a cluster head itself.

In one aspect, a method may involve a processor of an apparatus, implemented as a UE, determining whether there is a need to either join a cluster or become a cluster head in an NR V2X communication environment. The method may also involve the processor detecting whether there is any existing cluster head in the NR V2X communication environment responsive to determining that there is the need. The method may further involve the processor determining whether to join a first cluster associated with a first cluster head responsive to the first cluster head being detected as an existing cluster head in the NR V2X communication environment.

In one aspect, an apparatus may include a communication device and a processor coupled to the communication device. The communication device may be configured to communicate wirelessly. The processor may be configured to determine whether there is a need to either join a cluster or become a cluster head in an NR V2X communication environment. The processor may also be configured to detect, via the communication device, whether there is any existing cluster head in the NR V2X communication environment responsive to determining that there is the need.

It is noteworthy that, although description provided herein may be in the context of certain radio access technologies, networks and network topologies such as NR V2X and V2V, the proposed concepts, schemes and any variation(s)/derivative(s) thereof may be implemented in, for and by other types of radio access technologies, networks and network topologies such as, for example and without limitation, 5$^{th}$ Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to methods and apparatus of an NR V2X cluster head. According to the present disclosure, a number of possible solutions may be implemented separately or jointly. That is, although these possible solutions may be described below separately, two or more of these possible solutions may be implemented in one combination or another.

Figure 1:
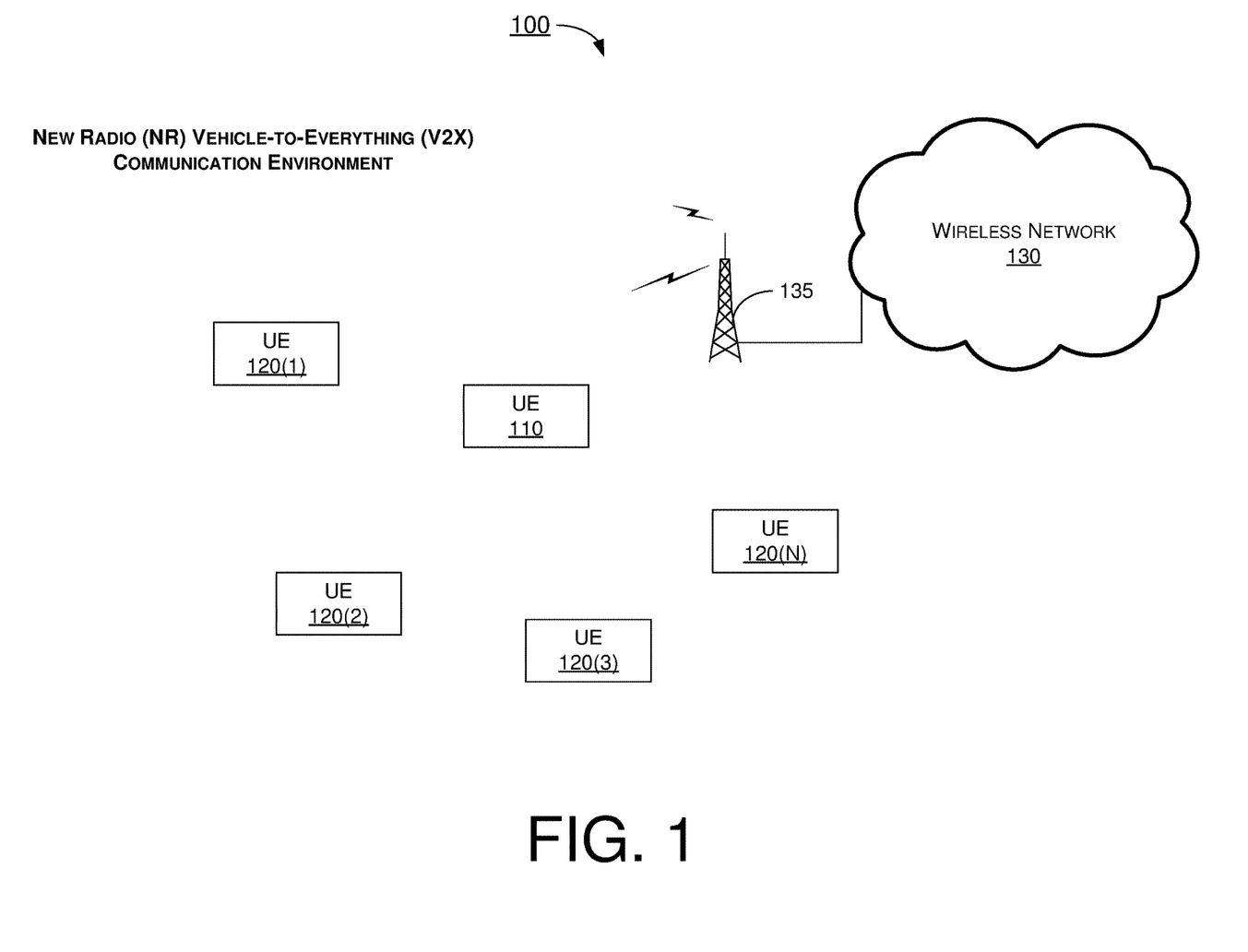
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a plurality of other UEs 120(1)~120(N), with N being a positive integer greater than 1, in an NR V2X communication environment. That is, each of UE 110 and other UEs 120(1)~120(N) may be in or as a part of, for example and without limitation, a vehicle, a roadside unit (RSU) (e.g., a traffic signal, a street lamp, a roadside sensor or a roadside structure), a portable device (e.g., smartphone) or an Internet of Thing (IoT). Moreover, UE 110 and one or more of UEs 120(1)~120(N) may also be in wireless communication with a wireless network 130 via a base station 135 (e.g., an eNB, gNB or transmit/receive point (TRP)). In network environment 100, UE 110 and the other UEs 120(1)~120(N) may implement various schemes pertaining to methods and apparatus of an NR V2X cluster head in accordance with the present disclosure, as described below.

Under a proposed scheme in accordance with the present disclosure, a cluster head may be configured by wireless network 130 (via base station 135) or preconfigured. For instance, when UEs 120(1)~120(N) (and, optionally, UE 110) form a platoon, a lead of the platoon or a roadside unit (RSU) may be a cluster head. Under the proposed scheme, a cluster head may service or otherwise function as a synchronization reference. For instance, when UE 110 or UE 120(1) is a cluster head, other UEs 120(2)~120(N) in the cluster may utilized a synchronization signal, a synchronization signal block (SSB), a control signal or a discovery signal from the cluster head to distinguish different clusters or cluster heads from each other.

Under the proposed scheme, as a cluster head, UE 110 and/or UE 120(1) may schedule time-frequency resources for other UEs 120(2)~120(N) in the cluster. For instance, the cluster head may sense its local environment (e.g., channel conditions, traffic status and the like) and, accordingly, schedule available resource(s) faster than base station 135. Moreover, some resource pool(s) may be reserved for the cluster head and may be preconfigured by radio resource control (RRC) signaling by wireless network 130 (e.g., via base station 135) or dynamically scheduled by wireless network 130 (e.g., via base station 135).

Under the proposed scheme, as a cluster head, UE 110 and/or UE 120(1) may transmit a sidelink control information (SCI) or an SSB to other UEs in the cluster, with the SCI or SSB containing one or more bits indicating an identification (ID) of the cluster head. Under the proposed scheme, a number of bits used to indicate the cluster head ID may be preconfigured or signaled by RRC from wireless network 130 (e.g., via base station 135).

With respect to conditions for becoming a cluster head, under a proposed scheme in accordance with the present disclosure, a UE (e.g., UE 110 and/or UE 120(1)) may be assigned by base station 135 or wireless network 130 to serve or otherwise function as a cluster head. Alternatively, or additionally, UE 110 and/or UE 120(1) may be preconfigured (e.g., with appropriate features and capability) to become, serve or otherwise function as a cluster head.

Under the proposed scheme, UE 110 may detect whether there is any existing cluster head in its surrounding and, based on a result of the detection, determine whether to join a cluster associated with an existing cluster head (e.g., UE 120(1)) or for UE 110 to become a new cluster head itself. For instance, UE 110 may determine that there is a need to either join an existing cluster or become a new cluster head in response to at least one of the following being true: (a) a channel occupancy ratio (e.g., power or energy ratio) being higher than a ratio threshold; (b) UE 110 having a high throughput, a large packet size, or a demand that requires joining an existing cluster or UE 110 becoming a new cluster head; (c) a resource allocated by an existing cluster head being insufficient; and (d) a strength of a signal from the existing cluster head being lower than a signal strength threshold. In some implementations, each of the ratio threshold and the signal strength threshold may be dynamically signaled by wireless network 130 (e.g., via base station 135), semi-statically signaled by wireless network 130, or preconfigured.

Under the proposed scheme, in determining whether to join the existing cluster associated with an existing cluster head, UE 110 may determine to join the existing cluster in an event that a reference signal received power (RSRP) from the existing cluster head is greater than a RSRP threshold. Alternatively, UE 110 may determine to become a new cluster head itself in an event that the RSRP from the existing cluster head is less than the RSRP threshold. The RSRP threshold may be dynamically signaled by wireless network 130 (e.g., via base station 135), semi-statically signaled by wireless network 130, or preconfigured. Under the proposed scheme, in determining to become the new cluster head, UE 110 may randomly select a cluster head identification (ID) except an ID of the existing cluster head.

Illustrative Implementations

Figure 2:
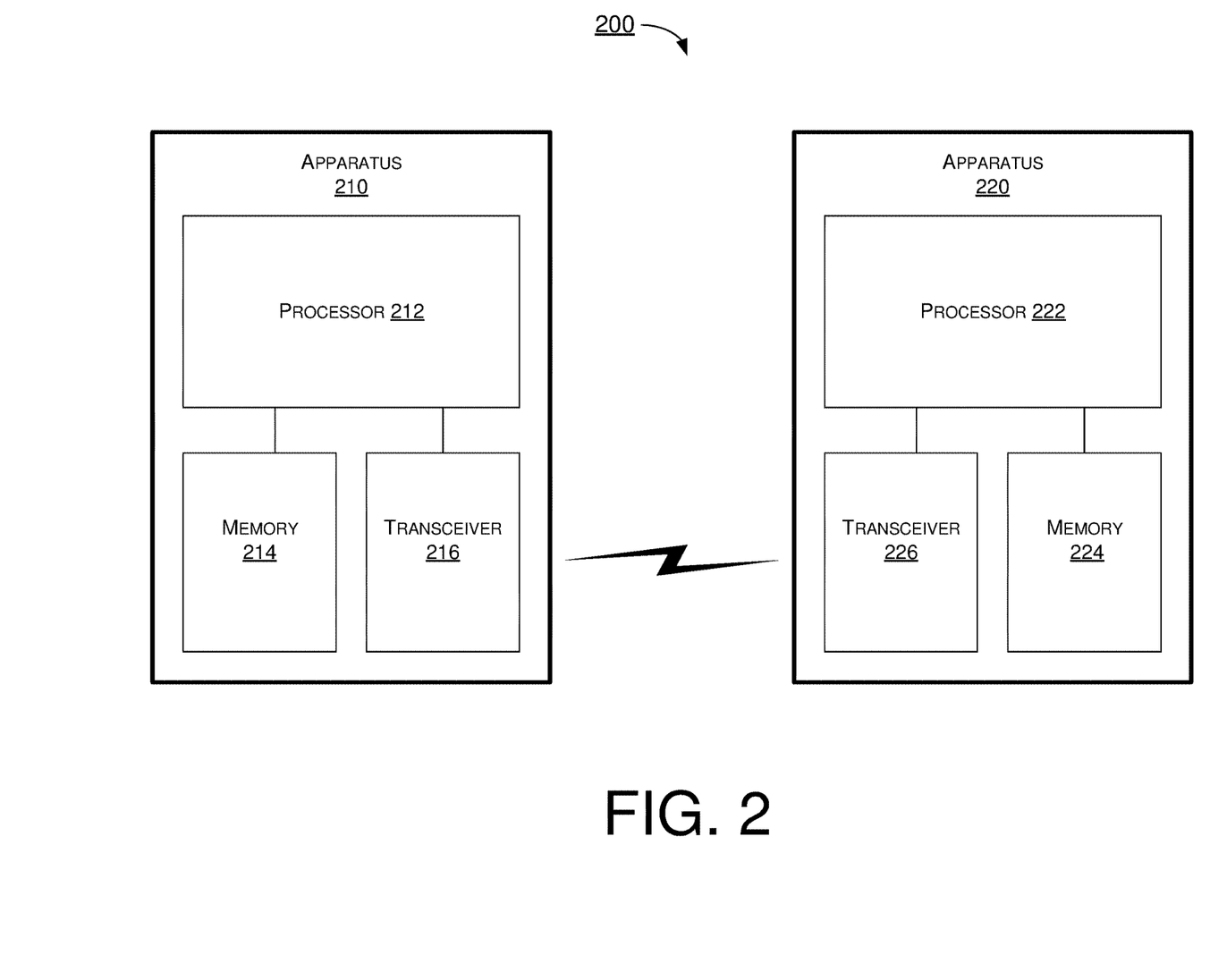
FIG. 2 is a block diagram of an example communication system in accordance with an implementation of the present disclosure.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to methods and apparatus of an NR V2X cluster head, including various schemes described above as well as process 300 described below.

Each of apparatus 210 and apparatus 220 may be a part of an electronic apparatus, which may be a UE such as a vehicle, a portable or mobile apparatus, a wearable apparatus, a wireless communication apparatus or a computing apparatus. For instance, each of apparatus 210 and apparatus 220 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, or one or more complex-instruction-set-computing (CISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a vehicle, a roadside unit (RSU), network node or base station (e.g., eNB, gNB or TRP), a small cell, a router or a gateway. For instance, at least one of apparatus 210 and apparatus 220 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, or one or more CISC processors.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including methods and apparatus of an NR V2X cluster head in accordance with various implementations of the present disclosure.

In some implementations, apparatus 210 may also include a transceiver 216, as a communication device, coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226, as a communication device, coupled to processor 222 and capable of wirelessly transmitting and receiving data. In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of an NR V2X communication environment in which apparatus 210 is implemented in or as a wireless communication device, a communication apparatus or a UE (e.g., UE 110) and apparatus 220 is implemented in or as another UE (e.g., UE 120(1)) of a cluster of UEs (e.g., UEs 120(1)~120(N)).

In one aspect of methods and apparatus of an NR V2X cluster head in accordance with the present disclosure, processor 212 of apparatus 210, as a UE (e.g., UE 110), may determine whether there is a need to either join a cluster or become a cluster head in an NR V2X communication environment. Additionally, processor 212 may detect, via transceiver 216, whether there is any existing cluster head in the NR V2X communication environment in response to determining that there is the need. Moreover, processor 212 may determine whether to join a first cluster associated with a first cluster head (e.g., UE 120(1)) in response to the first cluster head being detected as an existing cluster head in the NR V2X communication environment.

In some implementations, in determining whether there is the need, processor 212 may determine that there is the need in response to at least one of the following being true: (a) a channel occupancy ratio being higher than a ratio threshold; (b) the UE having a high throughput, a large packet size, or a demand that requires joining an existing cluster or the UE becoming a new cluster head; (c) a resource allocated by an existing cluster head being insufficient; and (d) a strength of a signal from the existing cluster head being lower than a signal strength threshold. In some implementations, each of the ratio threshold and the signal strength threshold may be dynamically signaled by a network (e.g., wireless network 130 via base station 135), semi-statically signaled by the network, or preconfigured.

In some implementations, in determining whether to join the first cluster associated with the first cluster head, processor 212 may perform some operations. For instance, processor 212 may determine to join the first cluster in an event that a reference signal received power (RSRP) from the first cluster head is greater than a RSRP threshold. Alternatively, processor 212 may determine to become a new cluster head in an event that the RSRP from the first cluster head is less than the RSRP threshold.

In some implementations, in determining to become the new cluster head, processor 212 may randomly select a cluster head identification (ID) except an ID of the first cluster head.

In some implementations, the RSRP threshold may be dynamically signaled by a network (e.g., wireless network 130 via base station 135), semi-statically signaled by the network, or preconfigured.

In some implementations, after joining the first cluster, processor 212 may perform additional operations. For instance, processor 212 may receive, via transceiver 216, a synchronization signal, a synchronization signal block (SSB), a control signal or a discovery signal from the first cluster head. Moreover, processor 212 may distinguish the first cluster head from one or more other cluster heads based on an ID of the first cluster head contained in the synchronization signal, the SSB, the control signal or the discovery signal.

Alternatively, after joining the first cluster, processor 212 may perform additional operations. For instance, processor 212 may receive, via transceiver 216, a sidelink control information (SCI) signal or an SSB from the first cluster head. In such cases, an ID of the first cluster head may be indicated by one or more bits in the SCI or the SSB.

Still alternatively, after joining the first cluster, processor 212 may perform additional operations. For instance, processor 212 may request, via transceiver 216, one or more time-frequency resources from the first cluster head. Furthermore, processor 212 may receive, via transceiver 216, an indication of allocation of the one or more time-frequency resources from the first cluster head.

In some implementations, after becoming the new cluster head of a new cluster, processor 212 may perform additional operations. For instance, processor 212 may transmit, via transceiver 216, a synchronization signal, an SSB, a control signal or a discovery signal to one or more member UEs of the new cluster such that the new cluster head is distinguishable from one or more other cluster heads by the one or more member UEs based on an ID of the first cluster head contained in the synchronization signal, the SSB, the control signal or the discovery signal.

Alternatively, after becoming the new cluster head of a new cluster, processor 212 may perform additional operations. For instance, processor 212 may transmit, via transceiver 216, an SCI signal or an SSB to one or more member UEs of the new cluster. In such cases, an ID of the new cluster head may be indicated by one or more bits in the SCI or the SSB. In some implementations, a number of the one or more bits may be preconfigured or configured by a radio resource control (RRC) signaling from a network (e.g., wireless network 130 via base station 135).

Still alternatively, after becoming the new cluster head of a new cluster, processor 212 may perform additional operations. For instance, processor 212 may receive, via transceiver 216, a request for one or more time-frequency resources from a member UE of the new cluster. Moreover, processor 212 may allocate the one or more time-frequency resources from a resource pool for the member UE. Furthermore, processor 212 may transmit, via transceiver 216, an indication of the allocation to the member UE. In some implementations, the resource pool may be preconfigured by an RRC signaling from a network (e.g., wireless network 130 via base station 135) or dynamically scheduled by the network.

Illustrative Processes

Figure 3:
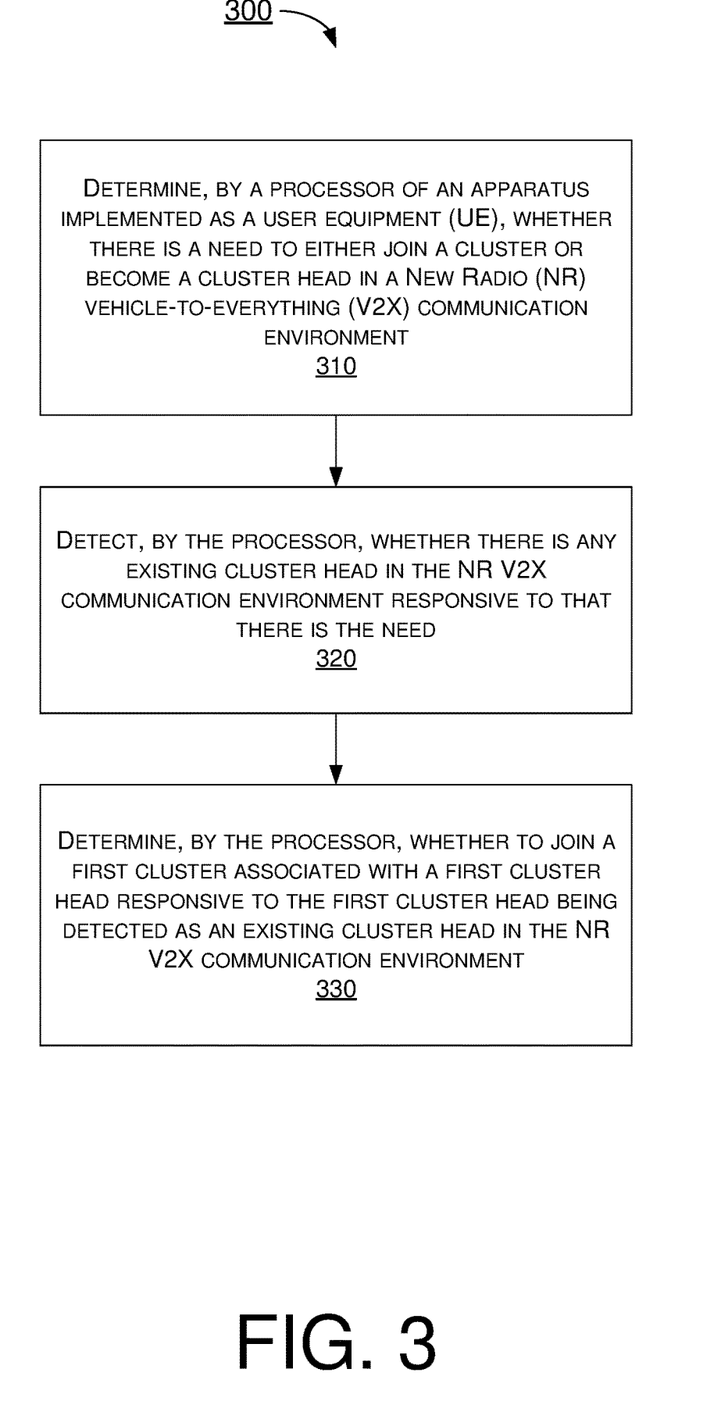
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to methods and apparatus of an NR V2X cluster head in accordance with the present disclosure. Process 300 may represent an aspect of implementation of features of apparatus 210 and apparatus 220. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220 and/or any suitable wireless communication device, UE, roadside unit (RUS), base station or machine type devices. Solely for illustrative purposes and without limitation, process 300 is described below in the context of apparatus 210 as a UE (e.g., UE 110) and apparatus 220 as another UE (e.g., UE 120(1)) of a plurality of UEs in a cluster (e.g., UE 120(1)~UE 120(N) in network environment 100). Process 300 may begin at block 310.

At 310, process 300 may involve processor 212 of apparatus 210 implemented as a UE (e.g., UE 110), determining whether there is a need to either join a cluster or become a cluster head in an NR V2X communication environment. Process 300 may proceed from 310 to 320.

At 320, process 300 may involve processor 212 detecting, via transceiver 216, whether there is any existing cluster head in the NR V2X communication environment in response to determining that there is the need. Process 300 may proceed from 320 to 330.

At 330, process 300 may involve processor 212 determining whether to join a first cluster associated with a first cluster head (e.g., UE 120(1)) in response to the first cluster head being detected as an existing cluster head in the NR V2X communication environment.

In some implementations, in determining whether there is the need, process 300 may involve processor 212 determining that there is the need in response to at least one of the following being true: (a) a channel occupancy ratio being higher than a ratio threshold; (b) the UE having a high throughput, a large packet size, or a demand that requires joining an existing cluster or the UE becoming a new cluster head; (c) a resource allocated by an existing cluster head being insufficient; and (d) a strength of a signal from the existing cluster head being lower than a signal strength threshold. In some implementations, each of the ratio threshold and the signal strength threshold may be dynamically signaled by a network (e.g., wireless network 130 via base station 135), semi-statically signaled by the network, or preconfigured.

In some implementations, in determining whether to join the first cluster associated with the first cluster head, process 300 may involve processor 212 performing some operations. For instance, process 300 may involve processor 212 determining to join the first cluster in an event that a reference signal received power (RSRP) from the first cluster head is greater than a RSRP threshold. Alternatively, process 300 may involve processor 212 determining to become a new cluster head in an event that the RSRP from the first cluster head is less than the RSRP threshold.

In some implementations, in determining to become the new cluster head, process 300 may involve processor 212 randomly selecting a cluster head ID except an ID of the first cluster head.

In some implementations, the RSRP threshold may be dynamically signaled by a network (e.g., wireless network 130 via base station 135), semi-statically signaled by the network, or preconfigured.

In some implementations, after joining the first cluster, process 300 may involve processor 212 performing additional operations. For instance, process 300 may involve processor 212 receiving, via transceiver 216, a synchronization signal, a synchronization signal block (SSB), a control signal or a discovery signal from the first cluster head. Moreover, process 300 may involve processor 212 distinguishing the first cluster head from one or more other cluster heads based on an ID of the first cluster head contained in the synchronization signal, the SSB, the control signal or the discovery signal.

Alternatively, after joining the first cluster, process 300 may involve processor 212 performing additional operations. For instance, process 300 may involve processor 212 receiving, via transceiver 216, a sidelink control information (SCI) signal or an SSB from the first cluster head. In such cases, an ID of the first cluster head may be indicated by one or more bits in the SCI or the SSB.

Still alternatively, after joining the first cluster, process 300 may involve processor 212 performing additional operations. For instance, process 300 may involve processor 212 requesting, via transceiver 216, one or more time-frequency resources from the first cluster head. Furthermore, process 300 may involve processor 212 receiving, via transceiver 216, an indication of allocation of the one or more time-frequency resources from the first cluster head.

In some implementations, after becoming the new cluster head of a new cluster, process 300 may involve processor 212 performing additional operations. For instance, process 300 may involve processor 212 transmitting, via transceiver 216, a synchronization signal, an SSB, a control signal or a discovery signal to one or more member UEs of the new cluster such that the new cluster head is distinguishable from one or more other cluster heads by the one or more member UEs based on an ID of the first cluster head contained in the synchronization signal, the SSB, the control signal or the discovery signal.

Alternatively, after becoming the new cluster head of a new cluster, process 300 may involve processor 212 performing additional operations. For instance, process 300 may involve processor 212 transmitting, via transceiver 216, an SCI signal or an SSB to one or more member UEs of the new cluster. In such cases, an ID of the new cluster head may be indicated by one or more bits in the SCI or the SSB. In some implementations, a number of the one or more bits may be preconfigured or configured by a radio resource control (RRC) signaling from a network (e.g., wireless network 130 via base station 135).

Still alternatively, after becoming the new cluster head of a new cluster, process 300 may involve processor 212 performing additional operations. For instance, process 300 may involve processor 212 receiving, via transceiver 216, a request for one or more time-frequency resources from a member UE of the new cluster. Moreover, process 300 may involve processor 212 allocating the one or more time-frequency resources from a resource pool for the member UE. Furthermore, process 300 may involve processor 212 transmitting, via transceiver 216, an indication of the allocation to the member UE. In some implementations, the resource pool may be preconfigured by an RRC signaling from a network (e.g., wireless network 130 via base station 135) or dynamically scheduled by the network.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus implemented as a user equipment (UE), whether there is a need to either join a cluster or become a cluster head in a New Radio (NR) vehicle-to-everything (V2X) communication environment; and
   detecting, by the processor, whether there is any existing cluster head in the NR V2X communication environment responsive to determining that there is the need,
   wherein the determining of whether there is the need comprises determining that there is the need responsive to a resource allocated by an existing cluster head being insufficient.

2. The method of claim 1, wherein the determining of whether there is the need comprises determining that there is the need further responsive to at least one of:
   a channel occupancy ratio being higher than a ratio threshold;
   the UE having a high throughput, a large packet size, or a demand that requires joining an existing cluster or the UE becoming a new cluster head; and
   a strength of a signal from the existing cluster head being lower than a signal strength threshold.

3. The method of claim 2, wherein each of the ratio threshold and the signal strength threshold is dynamically signaled by a network, semi-statically signaled by the network, or preconfigured.

4. The method of claim 1, further comprising:
   determining, by the processor, whether to join a first cluster associated with a first cluster head responsive to the first cluster head being detected as an existing cluster head in the NR V2X communication environment.

5. The method of claim 4, wherein the determining of whether to join the first cluster associated with the first cluster head comprises:
   determining to join the first cluster in an event that a reference signal received power (RSRP) from the first cluster head is greater than a RSRP threshold; or
   determining to become a new cluster head in an event that the RSRP from the first cluster head is less than the RSRP threshold.

6. The method of claim 5, wherein the determining to become the new cluster head comprises randomly selecting a cluster head identification (ID) except an ID of the first cluster head.

7. The method of claim 5, wherein the RSRP threshold is dynamically signaled by a network, semi-statically signaled by the network, or preconfigured.

8. The method of claim 5, after joining the first cluster, further comprising:
   receiving, by the processor, a synchronization signal, a synchronization signal block (SSB), a control signal or a discovery signal from the first cluster head; and
   distinguishing, by the processor, the first cluster head from one or more other cluster heads based on an identification (ID) of the first cluster head contained in the synchronization signal, the SSB, the control signal or the discovery signal.

9. The method of claim 5, after joining the first cluster, further comprising:
   receiving, by the processor, a sidelink control information (SCI) signal or a synchronization signal block (SSB) from the first cluster head,
   wherein an identification (ID) of the first cluster head is indicated by one or more bits in the SCI or the SSB.

10. The method of claim 5, after joining the first cluster, further comprising:
    requesting, by the processor, one or more time-frequency resources from the first cluster head; and
    receiving, by the processor, an indication of allocation of the one or more time-frequency resources from the first cluster head.

11. The method of claim 5, after becoming the new cluster head of a new cluster, further comprising:
    transmitting, by the processor, a synchronization signal, a synchronization signal block (SSB), a control signal or a discovery signal to one or more member UEs of the new cluster such that the new cluster head is distinguishable from one or more other cluster heads by the one or more member UEs based on an identification (ID) of the first cluster head contained in the synchronization signal, the SSB, the control signal or the discovery signal.

12. The method of claim 5, after becoming the new cluster head of a new cluster, further comprising:
    transmitting, by the processor, a sidelink control information (SCI) signal or a synchronization signal block (SSB) to one or more member UEs of the new cluster,
    wherein an identification (ID) of the new cluster head is indicated by one or more bits in the SCI or the SSB.

13. The method of claim 12, wherein a number of the one or more bits is preconfigured or configured by a radio resource control (RRC) signaling from a network.

14. The method of claim 5, after becoming the new cluster head of a new cluster, further comprising:
    receiving, by the processor, a request for one or more time-frequency resources from a member UE of the new cluster;
    allocating, by the processor, the one or more time-frequency resources from a resource pool for the member UE; and
    transmitting, by the processor, an indication of the allocation to the member UE.

15. The method of claim 14, wherein the resource pool is preconfigured by a radio resource control (RRC) signaling from a network or dynamically scheduled by the network.

16. An apparatus implemented as a user equipment (UE), comprising:
    a communication device configured to communicate wirelessly; and
    a processor coupled to the communication device and configured to perform operations comprising:
       determining, via the communication device, whether there is a need to either join a cluster or become a cluster head in a New Radio (NR) vehicle-to-everything (V2X) communication environment; and
       detecting, via the communication device, whether there is any existing cluster head in the NR V2X communication environment responsive to determining that there is the need,
    wherein, in determining whether there is the need, the processor is configured to determine that there is the need responsive to a resource allocated by an existing cluster head being insufficient.

17. The apparatus of claim 16, wherein, in determining whether there is the need, the processor is configured to determine that there is the need further responsive to at least one of:
    a channel occupancy ratio being higher than a ratio threshold;

the UE having a high throughput, a large packet size, or a demand that requires joining an existing cluster or the UE becoming a new cluster head; and a strength of a signal from the existing cluster head being lower than a signal strength threshold, wherein each of the ratio threshold and the signal strength threshold is dynamically signaled by a network, semi-statically signaled by the network, or preconfigured.

18. The apparatus of claim 16, wherein the processor is further configured to perform operations comprising:

determining whether to join a first cluster associated with a first cluster head responsive to the first cluster head being detected as an existing cluster head in the NR V2X communication environment.

19. The apparatus of claim 18, wherein, in determining whether to join the first cluster associated with the first cluster head, the processor is configured to perform operations comprising:

determining to join the first cluster in an event that a reference signal received power (RSRP) from the first cluster head is greater than a RSRP threshold; or determining to become a new cluster head in an event that the RSRP from the first cluster head is less than the RSRP threshold.

20. The apparatus of claim 19, wherein, in determining to become the new cluster head, the processor is configured to randomly select a cluster head identification (ID) except an ID of the first cluster head, and wherein the RSRP threshold is dynamically signaled by a network, semi-statically signaled by the network, or preconfigured.

* * * * *